Sept. 29, 1970 D. G. WAY 3,531,057
TAPE ROLLS AND MEANS FOR SUPPORTING THEM IN DISPENSERS
Filed Jan. 9, 1969 4 Sheets-Sheet 1
Fig.1.
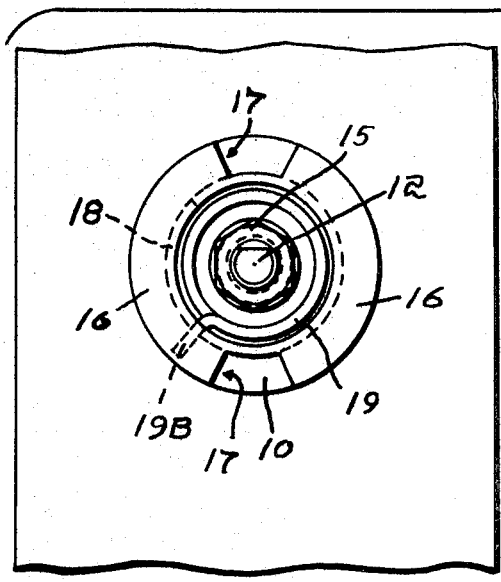
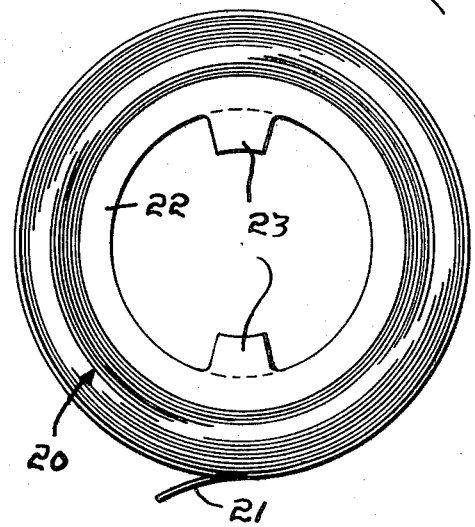
Fig.2.
Fig.3.
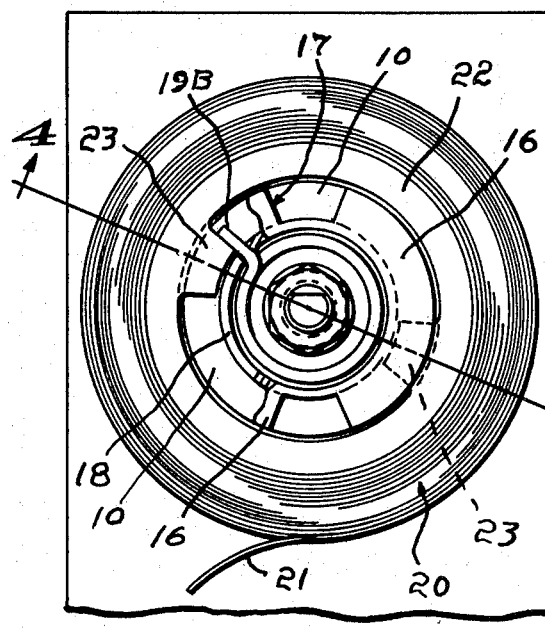
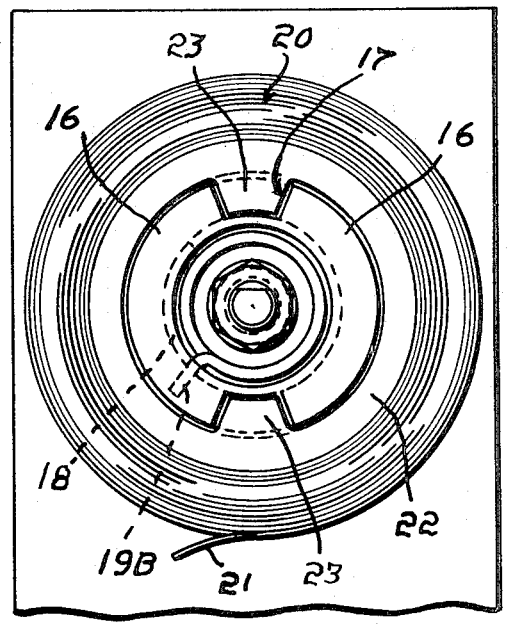
Inventor:
David G. Way,
by Abbot Spear,
Attorney Inventor:
David G. Way,
by Abbott Spear,
Attorney

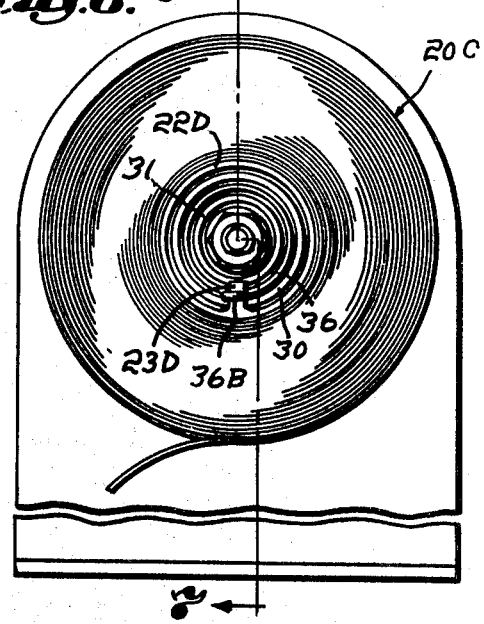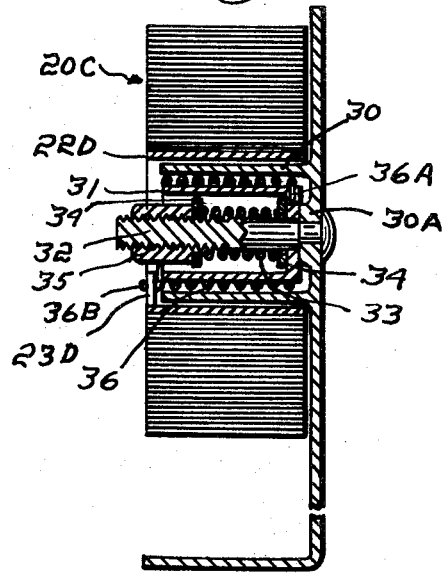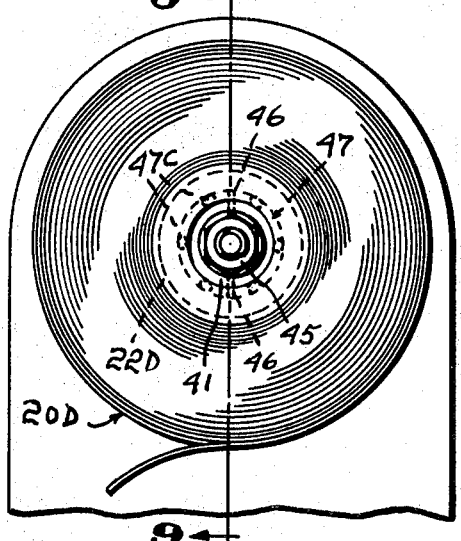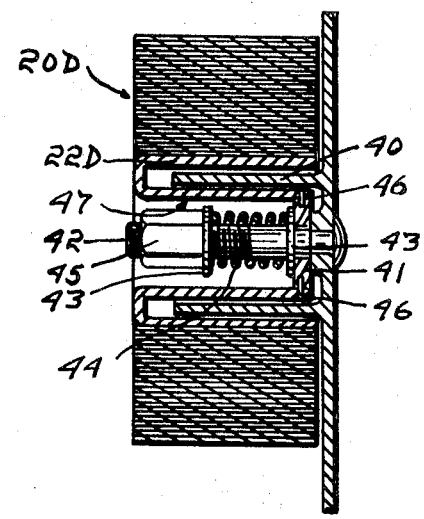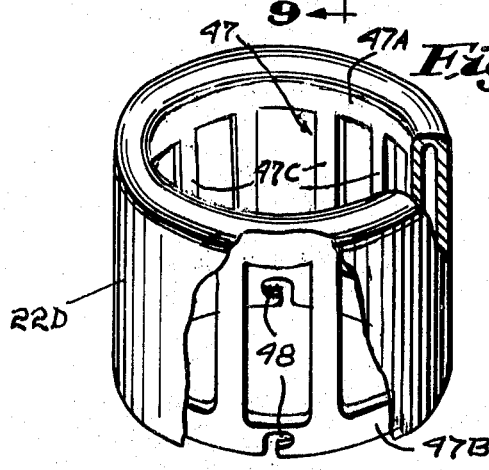

Sept. 29, 1970  D. G. WAY  3,531,057
TAPE ROLLS AND MEANS FOR SUPPORTING THEM IN DISPENSERS
Filed Jan. 9, 1969  4 Sheets-Sheet 4

Inventor:
David G. Way,
by Abbott Spear
Attorney

United States Patent Office 3,531,057
Patented Sept. 29, 1970

3,531,057
TAPE ROLLS AND MEANS FOR SUPPORTING THEM IN DISPENSERS
David G. Way, Boxborough, Mass., assignor to Tapeler Corporation, Newton, Mass., a corporation of Massachusetts
Continuation-in-part of application Ser. No. 562,408, July 1, 1966. This application Jan. 9, 1969, Ser. No. 798,852
Int. Cl. B65h *19/00;* A47k *10/22*
U.S. Cl. 242—55.2                                              17 Claims

ABSTRACT OF THE DISCLOSURE

Tape and dispenser combinations comprising a core member mounted for rotation on a fixed support member, and a drag between the rotatable member and the support, and rotatable biasing means connected to the members and separable with respect to one of them thereby providing for the rotatable support of the roll and cushioning the pull on the tape during dispensing and providing a slack take-up. The releasable connection may be in the form of a lug on the core member and the lugs of varying width core members are located in a predetermined relation to the width of the wound tape to bring the center line of the wound tapes into the same position when located on the support member.

---

Figure 4:
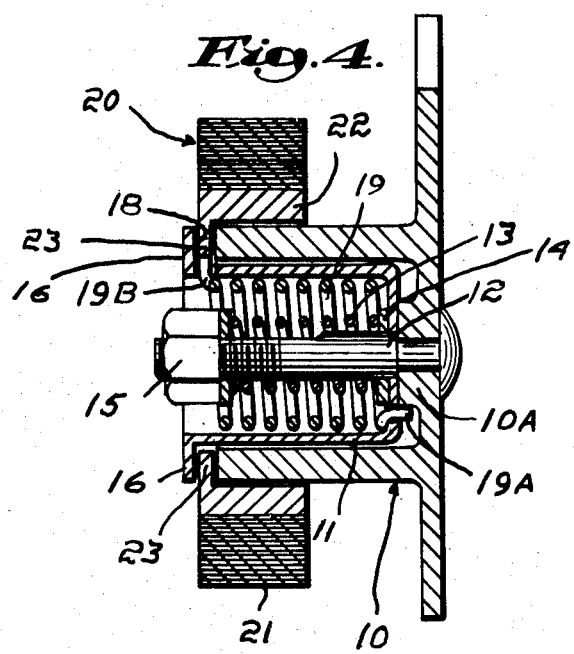

The present application is a continuation-in-part of my co-pending application, Ser. No. 562,408, filed July 1, 1966 now abandoned.

The present invention relates to rolls of tape and to the means by which they may be so mounted in a tape dispenser as to insure roll unwinding in a manner meeting requirements where lengths of tapes are to be dispensed and applied to surfaces.

In my co-pending application, Ser. No. 552,662, filed Apr. 25, 1966 there are shown devices for dispensing and applying lengths of pressure sensitive tapes. In the actuation of such devices, the tape is subjected to an unwinding pull that imposes the requirements that the rolls be so supported that slack is taken up and the pull on the tape cushioned, but with the roll restrained against turning too freely in response to such pulls.

The present invention has, for the general objective, the provision of roll supporting means that enable the above generally indicated requirements to be met while additionally ensuring that a tape roll may be easily and securely mounted in a dispenser only in a position in which it rotates in a predetermined unwinding direction with a resilient, rotatable biasing connection operable as the roll turns both in unwinding and in recovery directions. In addition, a particular objective, when tapes of different widths are to be used in the same dispenser, is to provide that they have coincident center lines when secured in the dispenser and another important objective is to provide means to prevent a mounted roll from becoming accidentally detached.

It will be appreciated that the use of tape that is unsuitable for a dispenser must be prevented. Tape may be unsuitable for use for a variety of reasons, too fragile a web or an unsatisfactory adhesive, for examples. The former would obviously lead to malfunctions simply requiring tape roll replacement while the latter defect could lead to the necessity of extensive servicing because of gum deposits on various parts. In either case, the dispenser would be considered as defective when in fact failure to function properly would be due entirely to deficiencies in the tape.

In accordance with the invention, roll supporting means for a tape dispensing device of the above referred to type consists of a fixed support adapted to rotatably receive and support the core member of a tape roll, a rotatable member connected by a drag to the support, and a resilient, rotatably biasing connection between the core and rotatable members and releasable from one of them. In one case, the connection is releasable with respect to the core member while in the other case, the connection is releasable with respect to the rotatable member. In both cases, the core members are provided with connecting portions enabling them to be quickly and easily placed in the dispenser in a manner ensuring proper functioning while tape rolls not having such portions cannot be operatively connected to the supporting means.

In the accompanying drawings, there are shown illustrative embodiments of the invention from which these and other of its objectives, novel features, and advantages will be readily apparent.

Figure 5:
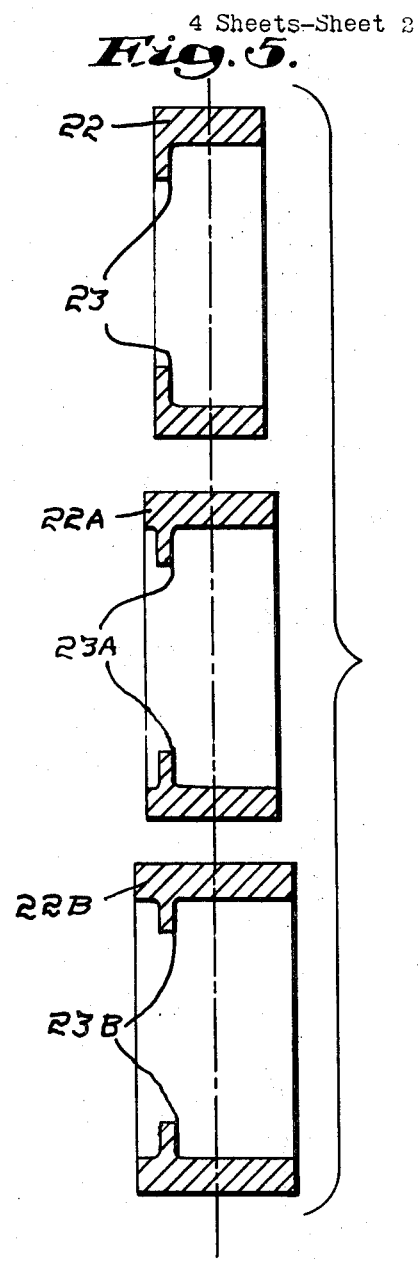
Figure 10:
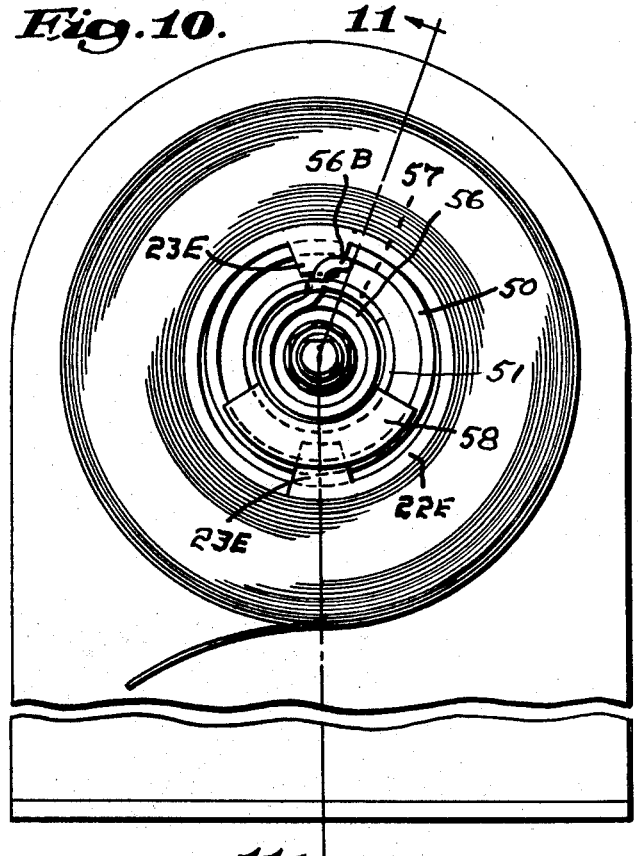
Figure 11:
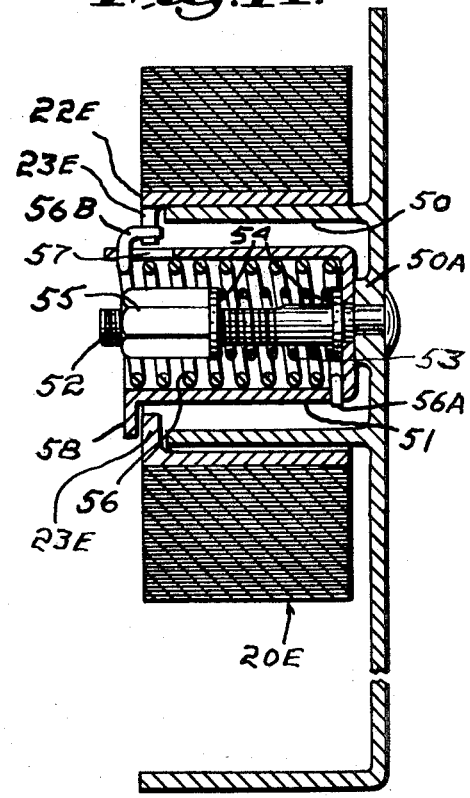

In the drawings:

FIG. 1 is a view of the roll supporting means of a tape dispenser with a tape roll beside it, FIG. 2 is a like view but with the tape roll placed on the support of the roll supporting means, FIG. 3 is a view similar to FIG. 2 but with the tape roll turned into support rotating position, FIG. 4 is a section taken approximately along lines 4—4 of FIG. 3, FIG. 5 is a view illustrating the construction of the core member that enables rolls of tape of different widths to have a common center line when mounted in a dispenser, FIG. 6 is a side view of a roll attached to roll supporting means in accordance with another embodiment of the invention, FIG. 7 is a section taken approximately along the indicated lines 7—7 of FIG. 6, FIG. 8 is a view similar to FIG. 6 illustrating yet another embodiment of the invention, FIG. 9 is a section taken approximately along the indicated lines 9—9 of FIG. 8, FIG. 9A is a partly sectioned perspective view, on an increased scale, of the tape roll core by itself, FIG. 10 is a view similar to FIGS. 6 and 8 illustrating an additional embodiment of the invention, and FIG. 11 is a section taken approximately along the indicated lines 11—11 of FIG. 10.

In the embodiment of the invention illustrated by FIGS. 1–4, the support, an annular boss on the wall of a tape dispenser housing, for example, is generally indicated at 10. The support 10 receives within it a member 11, shown as a cup rotatably supported by a fixed bolt 12 supported by the end wall 10A and axially supporting a coil spring 13 seating a washer 14 against the end wall of the rotatable member 11 and compressed to provide a drag by a nut 15 threaded on the bolt 12, the spring 13 urging the member 11 against the end wall 10A.

The axial extent of the member 11 is such that its outer end protrudes a short distance beyond the outer end of the support 10 and, at its outer end, there are diametrically opposed, outwardly disposed flanges 16, both of the same arcuate extent and spaced apart to provide narrow gaps 17. In back of one of the flanges 16, the member 11 has a circumferentially extending slot 18 shown as slightly shorter than the flanges 16 and the proximate end of the support 10. A coil spring 19 within the rotatable member 11 has its inner end 19A anchored to the end wall of the member 11 and its outer end 19B bent and extending radially outwardly through the slot 18, the spring 19 yieldably maintaining the spring end 19B against the end of the slot 18 that is the trailing end, considering the normal direction of rotation for tape unwinding as clockwise as viewed in FIG. 1.

A tape roll, generally indicated at 20, consists of a length of adhesive coated tape 21 wound on a core member 22 dimensioned to fit the support 10 for rotation independently thereof and having, adjacent the roll face that is to be the outer face of the roll when mounted in a dispenser, a pair of diametrically opposed, inwardly extending lugs 23. The lugs 23 are dimensioned for entry through the gaps 17 against the outer end of the support 10 and, when the roll 20 is turned in a clockwise direction, for entry in back of the flanges 16 with one lug 23 engaging the spring end 19B.

In practice, such turning of the tape roll 20 results when the tape 21 is pulled therefrom and attached to the mechanism which when actuated dispenses a length thereof. The length of the flanges 16 relative to the length of the slot 18 is such that, when the tape is thus attached, each lug 23 is yieldably held behind at the appropriate one of the flanges 16 at all times thereby preventing the accidental detachment of a roll 20.

It will be appreciated that a tape dispenser, such as that shown in the above-referred-to application Ser. No. 552,662, has a predetermined path for the tape and that, when tapes of different widths are used, their center lines must coincide reasonably closely with the center line of such a path. In FIG. 5, additional tape roll cores 22A and 22B are shown. These differ from the roll 20 in the width of their tape, in the axial extent of the cores 22A and 22B, respectively, and in the location of their lugs 23A and 23B, respectively, relative to the face of the rolls that is to be outermost when mounted in a dispenser. The lugs 23A and 23B are so located as to bring the center lines of their tapes in the same position as that of the roll 20 when the rolls are positioned on the support 10 and connected to the rotatable member 11.

The embodiment of the invention shown in FIGS. 6 and 7 is generally similar to that described in that a support 30 has a cup member 31 rotatably supported within it by a fixed bolt 32. A coil spring 33 on the bolt 32 is compressed between D-shaped washers 34 by a nut 35 threaded on the bolt 32 to seat the member 31 against the end wall 30A thus to provide an adjustable drag.

A spring 36 fits freely in the space beetween the rotatable member 31 and the support 30 and has its inner end 36A anchored in the inner end of the member 31. The outer end 36B of the spring 31 is in the form of a hook thus to releasably catch the inwardly disposed lug 23D of the core 22D of the tape roll 20C.

In the embodiment of the invention illustrated by FIGS. 8, 9, and 9A, the support 40 is similar to the supports 10 and 30, and receives within it a member 41 rotatably mounted on a bolt 42 carrying a coil spring 44 between D-shaped washers 43 to provide a drag adjustable by turning the nut 45 in one direction or the other to the desired extent to seat the member 41 against the end wall 40A. The rotatable member 41 has outwardly projecting, diametrically opposed pins 46.

A tape roll 20D is shown, as may best be seen in FIG. 9A, as having its core 22D including a generally indicated inner member 47 with the outer ends of the core and the member 47 interconnected to so space the member 47 from the core 22D as to receive the support 40 freely between them. The member 47 is torsionally resilient and has L-shaped recesses 48 in its inner end to establish, with the pins 46, joints of the bayonet type between the torsionally resilient member 47 and the inner end of the member 41. The member 47 is shown as having annular end portions 47A and 47B and interconnecting portions 47C and it may be molder from suitable plastics, elastomers, or foamed elastomers to provide suitable torsional resilience.

The embodiment of the invention shown in FIGS. 10 and 11 is generally similar to the previously described embodiments. The support 50 receives a cup member 51 within it and the cup member 51 is rotatably supported by a bolt 52 with a coil spring 53 compressed between D-shaped washers 54 by the nut 55 to seat the member 51 against the end wall 50A to provide an adjustable drag.

A coil spring 56 within the member 51 has its inner end 56A anchored thereto with its outer end extending through a slot 57 in the member 51 and terminating in a hook 56B disposed to catch one of the inwardly disposed, diametrically opposed lugs 23E with which the core 22A of the tape roll 20E is provided. It will be noted that the member 51 extends beyond the outer end of the support 50 and has an inturned flange 58 confining the other lug 23E thus to assist in securing the tape roll 20E.

From the foregoing, it will be appreciated that the tape rolls and the supporting means therefor are well adapted to meet all requirements. In use, the resilient rotatable bearing connection between the core member of a roll and the rotatable member of the supporting means ensures that the pull on the tape during dispensing is cushioned and that any slack is taken up. At the same time, the invention enables the tape rolls to be easily removed and replaced and the necessity for portions of the core members that are essential to the interconnection of the members prevent the use of unsatisfactory tapes.

I claim:
1. In a tape dispenser, a tape roll including a core member, a fixed support having a projection rotatably supporting said core member, a rotatable member within said projection, a drag between said rotatable member and said support, rotatable biasing means, and connections between said members and said means, one of said connections being separable.

2. The tape dispenser of claim 1 in which the connection that is separable is the connection between the core member and the biasing means.

3. The tap dispenser of claim 1 in which the biasing means forms part of said core member and said connection that is separable is between the biasing means and the rotatable member.

4. The tape dispenser of claim 1 in which the biasing means is a coil spring, the rotatable member includes a tubular portion having a slot through which an end portion of the spring extends and by which its arcuate movement relative thereto is limited, and the separable connection is said spring end portion and a core member portion releasably engaged therewith.

5. The tape dispenser of claim 4 in which the slot is circumferential.

6. The tape dispenser of claim 1 in which the biasing means is a coil spring, and the separable connection is an inwardly disposed lug on the core member and a hook at one end of the spring in engagement therewith.

7. The tape dispenser of claim 1 in which the biasing means is a coil spring, the rotable member includes a tubular portion having at least one outwardly disposed flange, and the core member has at least one inwardly disposed lug, the lug and flange relationship being such as to permit the core member to be inserted on the projection and turned to bring its lug behind the flange of the rotatable member thus to provide means to prevent axial displacement of the core member while the lug and flap overlap, the tubular member has a circumferential slot through which an end of the coil spring extends and which is dimensioned and so located that rotation of the core member relative to the rotatable member during tape dispensing is insufficient to bring the lug out of overlapping relationship, the lug and coil spring end being then in engagement and establishing the separable connection.

8. The dispenser of claim 7 in which the core member includes a plurality of lugs and the rotatable member includes a plurality of flanges.

9. The tape dispenser of claim 4 in which the rotatable member includes an outwardly disposed flange circumferentially spaced from the slot and the core member has a pair of circumferentially spaced, inwardly disposed lugs, one lug being confined in back of the flange, the other lug and said spring end establishing the separable connection.

10. The tape dispenser of claim 4 in which the rotatable member includes a pair of outwardly disposed, circumferentially sapced flanges at its outer end and the circumferentially extending slot is rearwardly of one flange, the flanged end of the rotatable member extends outwardly beyond the outer end of the projection, and the core member has a pair of inwardly disposed lugs spaced and dimensioned for entry between the ends of the flanges of the rotatable member and confined between the flanges and the projection with one lug and said spring end establishing the separable connection.

11. The tape dispenser of claim 4 in which the rotatable member includes a flange at its outer end and the circumferentially extending slot is rearwardly thereof, the flanged end of the rotatable member extends outwardly beyond the outer end of the projection, and the core member has an inwardly disposed lug confined between the flange and the projection with the lug and said spring end being the separable connection.

12. The tape dispenser of claim 4 in which the portion of the core member in engagement with the outwardly extending end of the spring is a lug, the lug extending inwardly of the core member and located lengthwise of the axis of the roll in such relative relationship to the width of the tape as to establish its center line in a predetermined position relation to the projection of the fixed support.

13. A tape roll for the type of tape dispenser which has a fixed support having a roll-supporting projection, a rotatable member within said projection and having a portion of a separable connection, a drag between the rotatable member and the fixed support, said roll including an outer core member dimensioned to fit said projection for rotation thereon and a torsionally resilient sleeve connected to said outer core member dimensioned to fit freely within said projection, said sleeve including a separable connection portion for connection with the separable connection portion of the rotatable member.

14. The tape roll of claim 13 in which the sleeve includes a series of circumferentially spaced, lengthwise ribs.

15. The tape roll for the type of tape dispenser which has a fixed support having a roll-supporting projection, a rotatable member within said projection, a drag between the rotatable member and the fixed support, and a resilient rotatably biasing connection in the form of a spring connected at its inner end to the rotatable member and with its other end outwardly disposed, said roll including a core member dimensioned to fit on said projection and to rotate independently thereof and including an inwardly disposed lug positioned for engagement by the outwardly disposed end of the spring.

16. The tape roll of claim 15 in which the core member includes a second inwardly disposed lug diametrically opposed to the first lug.

17. The tape roll of claim 15 in which the lug is located lengthwise of the core axis in predetermined relation to the width of the tape wound thereon.

References Cited

UNITED STATES PATENTS 440,943  11/1890  Cheney _____ 242—107.3

FOREIGN PATENTS 300,220  11/1928  Great Britain.

GEORGE F. MAUTZ, Primary Examiner

U.S. Cl. X.R.

242—68.3, 75.4